Dec. 19, 1944.    G. R. PENNINGTON    2,365,354
METHOD FOR FABRICATING FLUID POWER TRANSMITTERS
Filed May 12, 1941
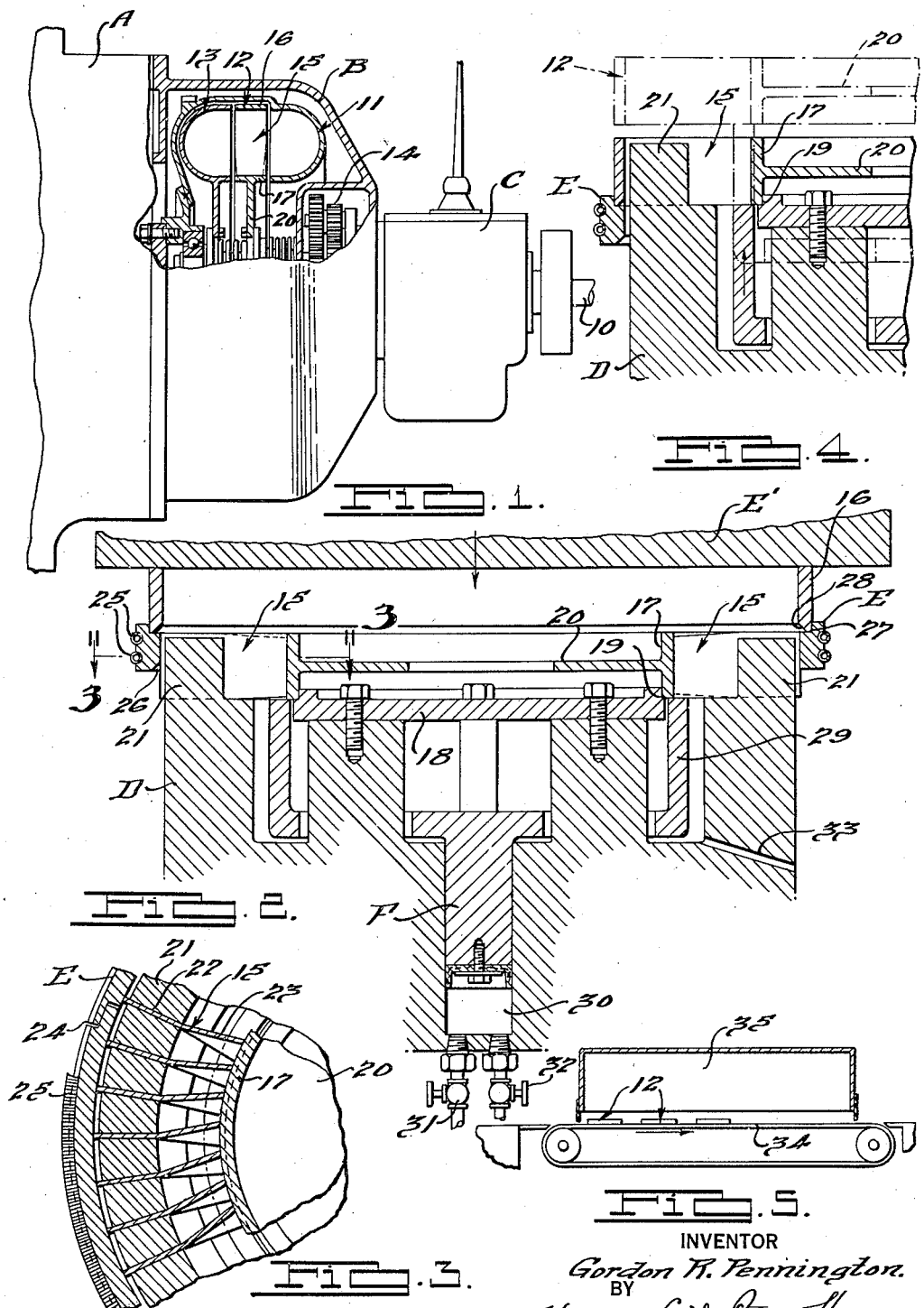
INVENTOR
Gordon R. Pennington.
BY
ATTORNEYS.

Patented Dec. 19, 1944

2,365,354

UNITED STATES PATENT OFFICE 2,365,354

METHOD FOR FABRICATING FLUID POWER TRANSMITTERS

Gordon R. Pennington, Bloomfield Hills, Mich., assignor to Chrysler Corporation, Highland Park, Mich., a corporation of Delaware Application May 12, 1941, Serial No. 393,057

4 Claims. (Cl. 29—156.8)

This invention relates to fluid drive-transmission and refers more particularly to improvements in the method of manufacturing fluid coupling structures.

One object of my invention is to provide an improved method for fabricating a fluid coupling structure particularly in connection with the assembly of the coupling vanes between inner and outer supports.

Another object is to provide improved method for use in fabricating a fluid coupling structure preparatory to welding or brazing the component assembled parts.

Another object is to provide improved method for fabricating fluid coupling structures having warped vane portions.

A further object is to provide an improved method for fabricating a coupling structure having its vanes under constant stress, preferably compressive between their supports.

Further objects and advantages of my invention will be more apparent as this specification progresses, reference being had to the accompanying drawing in which:

Fig. 1 is a sectional elevational view of a power transmitting system, parts being broken away to illustrate the fluid coupling.

Fig. 2 is a sectional elevational view of apparatus for the assembly of the coupling structure and illustrating the initial steps in the fabrication of such structure.

Fig. 3 is a detail sectional plan view taken as indicated by line 3—3 of Fig. 2.

Fig. 4 is a view of a portion of the Fig. 2 apparatus shown in another position and illustrating further step in the fabrication method.

Fig. 5 is a diagrammatic sectional elevational view illustrating the hydrogen brazing apparatus.

Referring to the drawing, I have illustrated a portion of a motor vehicle drive system generally similar to that forming the subject of the copending application of Carl Breer and myself, Serial No. 390,302, filed April 25, 1941, wherein engine A transmits its drive through fluid coupling B and thence through transmission C to the usual propeller shaft 10. As more particularly set forth in said copending application, the coupling B is of the multi-stage type having coaxial relatively rotatable vaned impeller structure 11 and vaned primary and secondary runner structures 12 and 13 respectively. At times the runner 12 drives transmission C through torque multiplying gearing 14 and at other times during normal cruising the structures 11, 12 and 13 rotate in unison except for a small amount of slip inherent in such devices.

The runner 12 is of the type in which its vanes 15 define passages therebetween which are open axially in opposite directions toward structures 11 and 13. With such runners there is considerable difficulty in fabricating the vanes and in assembling the same with the outer and inner vane-connected vane-carriers or annuli 16 and 17, respectively, especially in making a resulting assembly which has the desired rigidity to maintain its form and balance during operation.

Referring to Fig. 2, I provide an assembly apparatus comprising a main fixed support table D having a fixture 18 shouldered at 19 to locate the hub 20 thereon, this hub carrying the inner annulus 17. Carried by the table, either integrally or by separate fixture, are the upstanding fingers 21 spaced circumferentially around the table to receive the outer end portions 22 of vanes 15 in the desired relatively spaced positions. The inner end portions 23 are preferably warped relative to portions 22 and terminate in contact with annulus 17.

In the initial fabrication, the operator places hub 20 in the Fig. 2 position and inserts vanes 15 between the spaces of fingers 21 as in Fig. 3, the vanes being supported vertically by the upper face of table D. The outer ends of the vanes project freely beyond fingers 21, the latter serving to support the opposite side faces of the vanes and to resist buckling of the vanes when they are stressed radially inwardly as hereinafter set forth. Then a pilot or clamp ring E is applied downwardly, this ring being formed in a plurality of segments connected by circumferential clearance, as at 24 Fig. 3, with the component parts contracted radially by annular tension springs 25. The inner face of ring E adjacent its bottom edge is cut-back or bevelled at 26 so that it will not jam with the outer free ends of vanes 15 and to assist in guiding the ring into position exerting radial inward compression on the vanes. The arrangement is such that predetermined pressure is applied to each vane, as from 5 to 15 pounds as desired.

The ring E is forced down by any suitable power device, such as the ram E', preferably acting through the outer annulus 16 which seats in an annular locating shoulder 27 of ring E. The ring 16 has its inner bottom edge bevelled at 28 for functioning in a manner similar to the bevel 26. This ring 16 is preferably of slightly less diameter than ring E when the latter is in the Fig. 2 position so that ring 16 exerts a further radial compression on vanes 15 when ring 16 is forced downward into its final position of Fig. 4. At this time the ring E is pushed down free of the vanes 15 and the assembled runner 12 is now ready for removal from table D. The ring E thus operates as a temporary or pilot vane-carrier preliminary to the assembly of the final or permanent vane-carrier 16.

For releasing the runner 12 I have provided a fluid pressure operated piston F having the upstanding annular flange 29 which, when oil pressure is admitted to chamber 30 under control of valve 31, moves upwardly to act against ring 17 and vanes 15 to move the assembled runner 12 clear of table D as indicated at 12' in Fig. 4.

To restore piston F ready for the assembly of another runner, valve 31 is closed and the relief valve 32 is opened to allow the pressure fluid in chamber 30 to escape. Any fluid escaping upwardly beyond piston F drains off at passage 33.

The ring E and springs 25 are arranged so that on assembly of this ring as in Fig. 2, all slack in the vanes 15 is taken up and a predetermined radial compression of the order of 5 to 15 pounds by way of example is put on each vane. Application of ring E therefore serves to circumferentially align the outer ends of the vanes in preparation to receive the ring 16. When the ring 16 is assembled, an additional radial pressure is imposed on the vanes sufficient to compensate for any production variations which may not have been compensated for by the pilot ring E and to insure engagement of all vanes with ring 16. From two to eight thousandths of an inch on the inside diameter of ring 16 less than the diameter of ring E when in the Fig. 2 position should ordinarily be adequate. The rings E and 16 therefore exert progressive or stage pressures on vanes 15 and in the final assembly of the runner 15 the vanes 15 are under compression. The warped vane portions 23, apart from improving the efficiency of the coupling as set forth in said copending application, serve to impart rigidity to the vanes.

After removal of the assembled runner from table D, the assemblies are preferably hydrogen brazed or welded according to well-known commercial methods. In Fig. 5 I have diagrammatically illustrated the runners 12 travelling slowly on the continuous belt 34 while subjected to the usual hot atmosphere of hydrogen at 35 for causing the vanes 15 to fuse with rings 16 and 17 by reason of copper previously applied at these points. This process is well-known and need not be set forth in detail herein.

If desired, the ring 17 may be forced into position instead of ring 16 by the same assembly steps, in which case the ring 16 will, of course, be first installed on table D and rings E and 17 will be arranged to act expansively as will be obvious.

Because of the relatively high temperature ordinarily used for commercial hydrogen brazing, around 2100° F. where copper flux is employed, the compressive stress applied to vanes 15 to hold them in position for the brazing process will largely disappear when the brazed assembly is allowed to cool but sufficient compressive stress will remain in the final assembly to supplement the brazed attachment of the vanes to the rings 12 and 17 so as to assist in holding the vanes and rings against relative displacement. The extent of final or residual stress in the vanes may, of course, be varied to some extent by the amount of initial stress applied to the vanes.

I claim:

1. The method of manufacturing a vaned fluid power transmitter of the type having a pair of vane-connected carriers disposed in relatively spaced relation one within the other, comprising, assembling the vanes in circumferentially spaced relationship around one of said carriers such that one end of each of the vanes projects freely from the last mentioned carrier, applying a pilot carrier to said free ends so as to stress said vanes in a radial direction toward the last mentioned carrier thereby circumferentially aligning the free ends of said vanes in preparation to receive the other of said carriers, and then concurrently axially forcing said pilot carrier from said free ends and the last said carrier into position while maintaining said vanes under radial stress in said direction.

2. The method of manufacturing a vaned fluid power transmitter of the type having inner and outer concentric carrier rings spaced by a plurality of radially extending circumferentially spaced vanes, which comprises laying up a plurality of vanes on edge along regularly spaced radii, one end of each vane being positioned in substantial abutment with the periphery of one of said rings, the opposite end of each vane projecting freely from said ring, engaging each vane on opposite sides thereof to support said vane against buckling, simultaneously engaging all of the opposite ends of said vanes with contractible encircling means and imposing circumferential tension on said means, thereby to create a resultant force acting radially of said vanes to urge them into close abutment with said ring, thereafter displacing said encircling means axially of said vane ends, and effecting such displacement by moving the other ring axially of said vanes and inner ring until said other ring engages the opposite end of each vane and said encircling means is entirely freed from the vanes, said other ring having a diameter at its vane-engaging periphery sufficiently less than that of said encircling means to maintain and augment the compressive stress induced in said vanes by the application of the encircling means.

3. The method of manufacturing a vaned fluid power transmitter of the type having concentric inner and outer rings and a plurality of radially disposed circumferentially spaced vanes positioned between said rings, which comprises the steps of circumferentially positioning the vanes around said ring in edgewise position with the inner portions of the vanes abutting the outer periphery of the inner ring, supporting said vanes on their faces adjacent the outer ends thereof, engaging the outer ends of the vanes with radial pressure to cause said vanes to abut the inner ring uniformly, and thereafter forcing the outer ring axially over the outer ends of said vanes, said outer ring, at the time of such axial forcing, being of slightly less diameter than the overall dimension taken between outer ends of diametrically aligned vanes, thereby to require a positive pressure to force said outer ring axially and to impose a radial compressive stress on all of the said vanes.

4. The method of manufacturing a vaned fluid power transmitter of the type having concentric inner and outer rings and a plurality of radially disposed circumferentially spaced vanes positioned between said rings, which comprises the steps of circumferentially positioning the vanes around one ring in edgewise position with one end of the vanes abutting a periphery of the said one ring, supporting said vanes on their faces adjacent the other ends thereof, engaging the said other ends of the vanes with radial pressure to cause said vanes to abut the said one ring uniformly, and thereafter forcing the said other ring axially onto the said other ends of said vanes, said other ring, at the time of such axial forcing, being of slightly different diameter than the overall dimension taken between the said other ends of diametrically aligned vanes, thereby to require a positive pressure to force said other ring axially and to impose a radial compressive stress on all of the said vanes.

GORDON R. PENNINGTON.